(12) United States Patent
De Cuyper et al.

(10) Patent No.: US 11,813,786 B2
(45) Date of Patent: Nov. 14, 2023

(54) PREFORM AND CONTAINER ADAPTED FOR ACCOMMODATING AN INSERT PIECE, WITH METHODS AND APPARATUS FOR THEIR PRODUCTION

(71) Applicant: RESILUX N.V., Wetteren (BE)

(72) Inventors: Dirk De Cuyper, Destelbergen (BE); William Dierickx, Destelbergen (BE); Jesus Aldaya, Badajoz (ES); Tom Anthierens, Bruges (BE)

(73) Assignee: RESILUX N.V., Wetteren (BE)

( * ) Notice: Subject to any disclaimer, the term of this patent is extended or adjusted under 35 U.S.C. 154(b) by 336 days.

(21) Appl. No.: 17/254,079

(22) PCT Filed: Jun. 27, 2019

(86) PCT No.: PCT/IB2019/055438
§ 371 (c)(1),
(2) Date: Dec. 18, 2020

(87) PCT Pub. No.: WO2000/003185
PCT Pub. Date: Jan. 2, 2020

(65) Prior Publication Data
US 2021/0260810 A1 Aug. 26, 2021

(30) Foreign Application Priority Data

Jun. 27, 2018 (EP) .................................. 18382476

(51) Int. Cl.
*B29C 49/06* (2006.01)
*B29C 49/08* (2006.01)
(Continued)

(52) U.S. Cl.
CPC .............. *B29C 49/06* (2013.01); *B29C 49/08* (2013.01); *B29C 49/20* (2013.01); *B65D 1/0246* (2013.01);
(Continued)

(58) Field of Classification Search
CPC .... B65D 1/0246; B65D 1/0284; B65D 25/50; B65D 47/068; B65D 25/48;
(Continued)

(56) References Cited

U.S. PATENT DOCUMENTS 3,308,998 A 3/1967 Oppasser et al.
5,207,356 A 5/1993 Krall
(Continued)

FOREIGN PATENT DOCUMENTS

DE 7629637 U1 2/1977
EP 0184264 A2 6/1986
(Continued)

OTHER PUBLICATIONS

Search Report and Written Opinion from corresponding EP Application No. EP18382476, dated Dec. 18, 2018.
(Continued)

*Primary Examiner* — Monica A Huson
(74) *Attorney, Agent, or Firm* — WORKMAN NYDEGGER

(57) ABSTRACT

The invention provides a mould core and injection moulding apparatus for the production of a preform using a mould core which in the zone for defining the neck part of the preform comprises a combination of a raised portion and a shallow groove with a depth of 0.01 to 1 mm provided in the raised portion, for defining an internal attachment means in the neck of the preform. The invention also provides a preform and a container made from the preform, with internal attachment means in the neck. The internal attachment means is carried out rotation symmetrically with respect to the longitudinal axis of the preform. The combinations with an insert piece, preferably a pouring spout, flexible hose or dosing cap, have also been described. Furthermore, the invention provides an injection moulding method for the
(Continued)

Detail A preform production and a stretch blow moulding method for the container production.

20 Claims, 6 Drawing Sheets

(51) Int. Cl.
    *B29C 49/20*     (2006.01)
    *B65D 1/02*     (2006.01)
    *B65D 25/50*     (2006.01)
    *B65D 47/06*     (2006.01)
    *B29L 31/00*     (2006.01)

(52) U.S. Cl.
    CPC ........... *B65D 1/0284* (2013.01); *B65D 25/50* (2013.01); *B65D 47/068* (2013.01); *B29C 2049/2021* (2013.01); *B29C 2949/0773* (2022.05); *B29C 2949/0794* (2022.05); *B29C 2949/0841* (2022.05); *B29L 2031/7158* (2013.01); *B65D 2547/066* (2013.01)

(58) Field of Classification Search
    CPC . B65D 2547/066; B29C 49/20; B29C 49/071; B29C 49/06; B29C 49/08; B29C 45/4407; B29C 2049/2021; B29C 2949/0722; B29C 2949/0773; B29C 45/37; B29C 2949/0794; B29C 2949/0844; B29C 2949/0715; B29C 2949/0772; B29C 2949/0731; B29C 45/261; B29C 2949/0841; B29C 2949/0744; B29B 11/14; B29B 11/08; B29L 2031/7158

See application file for complete search history.

(56) References Cited

U.S. PATENT DOCUMENTS

| | | |
|---|---|---|
| 2005/0139569 A1 | 6/2005 | Arsen et al. |
| 2005/0139609 A1 | 6/2005 | Giblin et al. |
| 2011/0031559 A1 | 2/2011 | Sel et al. |
| 2018/0044097 A1* | 2/2018 | Zeik ................ B29C 49/071 |

FOREIGN PATENT DOCUMENTS

| | | |
|---|---|---|
| EP | 0378047 A1 | 7/1990 |
| EP | 0972714 A2 | 1/2000 |
| FR | 2868983 A1 | 10/2005 |
| WO | 9414696 A1 | 7/1994 |
| WO | 9845207 A1 | 10/1998 |
| WO | 2011071897 A2 | 6/2011 |

OTHER PUBLICATIONS

International Search Report and Written Opinion from corresponding PCT Application No. PCT/IB2019/055438, dated Nov. 26, 2019.

* cited by examiner

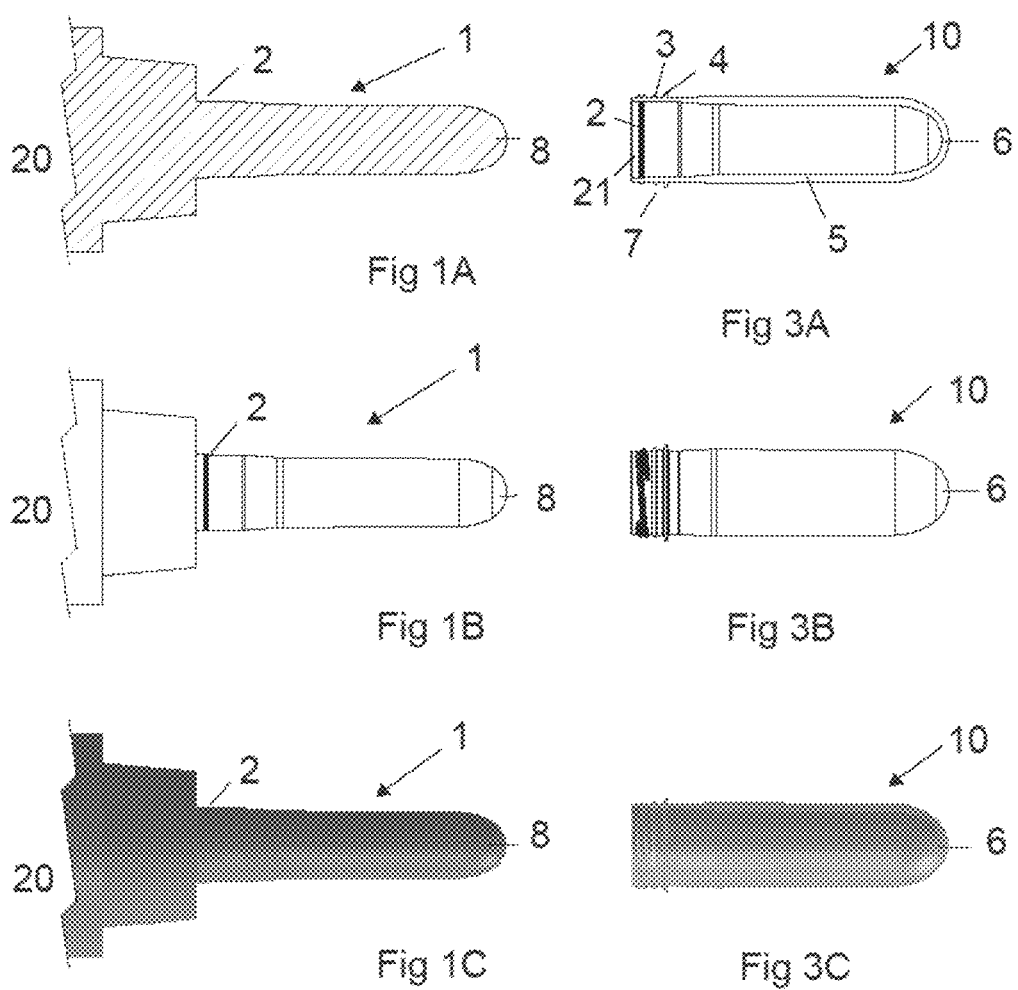

Detail A

Detail B

PREFORM AND CONTAINER ADAPTED FOR ACCOMMODATING AN INSERT PIECE, WITH METHODS AND APPARATUS FOR THEIR PRODUCTION

TECHNICAL FIELD

The invention is situated in the field of packaging, in particular in the field of containers obtained by means of stretch blow moulding based on a preform obtained by injection moulding. The invention is advantageous for use in the packaging of foodstuffs, such as drinks and oils; household products, such as detergents and fabric softeners; food, such as oil; chemical products such as fuel additives, sprays, plant food.

BACKGROUND

Packaging containers equipped with a pouring spout and a dosing cap are generally known. The pouring spout allows easy pouring of a liquid. The pouring of liquid into a dosing cap facilitates measuring of a desired amount of product.

Various methods are known for providing a packaging container with pouring spout and dosing cap. A commonly used method is to provide a screw thread on the neck of the container for accommodating the pouring spout, and to provide a screw thread on the neck of the pouring spout for accommodating a dosing cap. This configuration requires a structure that protrudes far above the container. This is not advantageous when stacking containers.

The threads are typically provided externally on the neck of the container. This entails more material consumption than if one could work internally.

Alternative designs have tried to fix the pouring spout inside the neck of the container. Providing an internal screw thread is technically possible but requires extra production steps and equipment.

EP 0 184 264 describes an extrusion method for blow moulding of a container with internal screw thread. Use is made of an expandable and retractable mould core to shape the internal part of the neck part by compression. The embodiment in FIG. 8 with a peripheral flange is not considered feasible because the configuration does not allow the flange to be inserted into the lower recess. Moreover, the storage of liquids requires the intake of the pouring spout to be liquid-tight.

US 2011/031559 discloses a separate tool (42) for applying extra features to the internal part of the neck by means of induction heating, after production.

US 2005/0139569 discloses the use of a rotating disc to still change the internal part of the neck in the neck part of a preform after production.

The above methods require complex tools. Changing the neck after production means that an extra step has to be provided. This is time-consuming and therefore costly.

US 2005/0139609 discloses an insert piece with pouring spout wherein the peripheral flange is placed on top of the container edge and serves as a stopping means. The insert piece is applied by wedging. Thus, the widest upper part gets fixed. Reinforcement ribs (24) are provided on the bottom (18) of the insert piece. For the production of the container, extrusion blow moulding and high-density polyethylene are preferred. The insert piece is preferably combined with a blown internal screw thread. It is not mentioned whether the wedged part is liquid-tight.

WO 94/14696 describes a container with integrally formed closure. The production process is depicted in FIG. 29. The closure is formed form a multi-part injection mold with sliding mold. The container neck and body are formed in a multi-part injection mold with core pin. The core pin has a smooth surface, without grooves, notch, protruding ribs or other modifications.

EP 0378047 discloses a one-part droplet catcher. The neck part is provided with an internal screw thread. The part is manufactured by injection moulding using a core pin with smooth surface and an extra part for the formation of the screw thread. To be able to remove the part from the mold, use is made of an instrument for the rotation of the injection moulded part. The injection moulded part is removed from the mold by means of rational movements. The mold has a complex and multi-part build. The rotation of the injection moulded part for the removal thereof, is problematic. The system is functional for screw threads, but does not work on structures with rotation symmetrical shaping.

There is therefore a need for further alternatives and improvements.

The present invention aims to provide a solution for one or more of the above-mentioned problems.

The object of the present invention is to provide a method which makes the production of containers with internal attachment means simpler, less costly and more reliable.

Furthermore, the object of the invention is to provide an improved combination of container/insert piece. The invention in particular aims to provide a non-permanent but liquid-tight connection. The invention also focuses on the parts for this purpose.

SUMMARY OF THE INVENTION

The present invention provides a method for producing a preform with an internal attachment means suitable for use in a stretch blow moulding process to form a container that can accommodate a pouring spout.

The present invention provides a preform with an internal attachment means suitable for use in a stretch blow moulding process to form a container that can accommodate a pouring spout.

The present invention also provides a stretch blow moulding process using a preform or injection moulding process for obtaining a preform, according to an embodiment of the invention.

In a further aspect, the invention provides a container with a neck part provided with an internal attachment means.

In yet a further aspect, the invention provides a combination of a container and an insert piece.

In a further aspect, the invention provides an injection moulding apparatus for the production of a preform according to an embodiment of the invention.

In a final aspect, an insert piece is provided for combination with a container according to an embodiment of the invention.

Preferred embodiments have been elaborated in the dependent claims.

DESCRIPTION OF THE DRAWINGS

The invention is illustrated with reference to Figures. These are not restrictive. Preferred embodiments of the invention are illustrated in FIGS. 1 to 6.

FIGS. 1A to 1C show a schematic representation of a mould core according to an embodiment of the invention for use in an injection moulding apparatus for the production of container preforms (scale 1:1). FIG. 1A shows a schematic cross-section. FIG. 1B schematically shows the outside. FIG. 1C is a three-dimensional representation.

FIG. 2A gives an overview, while in FIG. 2B a detail view (scale 10:1) of the provisions on the mould core is shown to form a preform with an internal attachment means according to the invention.

FIGS. 3A and 3B show a schematic representation of a preform according to an embodiment of the invention. FIG. 3A shows a schematic cross-section. FIG. 3B schematically shows the outside. FIG. 3C is a three-dimensional representation.

FIG. 4A shows a schematic cross-section. FIG. 4B schematically shows the outside. FIGS. 4C and 4D are three-dimensional representations.

DETAILED DESCRIPTION OF THE INVENTION

Figure 2A:
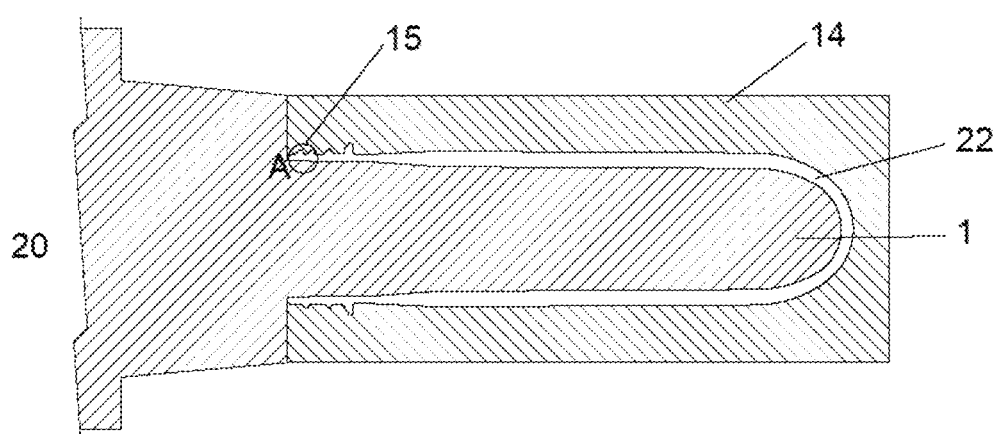
FIGS. 2A and 2B show a schematic cross-section of a mould for the production of a preform according to an embodiment of the invention. The mould is formed by a mould core incorporated in an injection mould (scale 1:1).

The invention provides a solution to the problem of obtaining containers suitable for accommodating an insert piece, preferably a pouring spout, without excessive use of raw material and without the use of a complex production technique or complicated fittings.

Unless otherwise defined, all terms used in the description of the invention, including technical and scientific terms, have the meaning as commonly understood by a person skilled in the art to which the invention pertains. Furthermore, definitions of the terms are included to better understand the description of the present invention.

As used here, the following terms have the following meaning: "A", "an", and "the" as used here refer to both the singular and the plural, unless the context indicates otherwise. "A compartment" refers, by way of example, to one or more than one compartment.

"About" as used herein, referring to a measurable value such as a parameter, an amount, a duration and the like, is intended to include variations of plus or minus 20% or less, preferably plus or minus 10% or less, more preferably plus or minus 5% or less, even more preferably plus or minus 1% or less, and even more preferably plus or minus 0.1% or less of the specified value, as far as such variations are suitable for carrying out in the described invention. It will be clear, however, that the value to which the term "about" relates is itself also specifically described. "Include", "comprising" and "comprises" and "consisting of" as used herein are synonymous with "contain", "containing" or "contains" and are inclusive or open terms that specify the presence of what follows, e.g. a component and the presence of additional, unnamed components, features, elements, parts, steps, which are well known in the art or described therein, and do not exclude them.

The recitation of numerical ranges by endpoints includes all numbers and fractions that are included within that range, as well as the endpoints mentioned.

The term "% w/w" as used herein means percentage by weight in which the weight ratio of an ingredient to the total weight of a bottle without closing means is expressed as a percentage.

In the prior art, undercuts are avoided because it is known that an injection moulded part with undercuts made of a hard material such as polyethylene terephthalate, abbreviated as PET, cannot be demoulded from the injection mould. Undercuts are therefore avoided at all costs in the design phase of injection moulded parts and injection moulds.

By the term "preform" as used herein, an object is meant that is similar to a tube sealed at the bottom. A preform comprises a bottom, a tubular wall which extends upwards from the bottom in an elongated manner thereby forming a body part and a neck part following the body part, the neck part located opposite the bottom forming a pouring opening.

Preforms for packaging containers are often provided with external or exterior attachment means. An example known from the prior art is a screw thread for accommodating a screw cap. The neck part can also be externally provided with a neck ring. A preform as used herein is a hollow object obtained by injection moulding from a thermoplastic composition.

Injection moulding is a moulding technique for thermoplastics, thermosetting plastics and metals with a low melting point. The present invention deals with the injection moulding of synthetic materials or plastics, in particular thermoplastics. With injection moulding, plastic which is supplied as granulate or powder, is melted to a viscous mass and is injected under high pressure into a mould of which the cavity is the shape of the desired product. Cooling solidifies the plastic and the desired product is obtained.

The thermoplastic plastic used in this invention is preferably a polyester. The polyester plastic material used in the invention is preferably selected from polyethylene terephthalate (PET), polyethylene furanoate (PEF), polyethylene naphthalate (PEN), polybutylene terephthalate (PBT) or combinations thereof; most preferably PET.

The PET content in the polyester composition is preferably at least 75% w/w, more preferably, at least 85% w/w, most preferably at least 95% w/w. Preferably, the PET content in the bottle composition is at least 75% w/w, more preferably at least 85% w/w, most preferably at least 95% w/w PET.

The polyester, preferably PET, may comprise recycled polyester material. A bottle according to an embodiment of the invention preferably contains at least 30% w/w recycled polyester or recycled PET (rPET); more preferably at least 50% w/w recycled polyester or recycled PET (rPET); most preferably at least 80% w/w.

An injection mould is made up of several assembled and loose parts, mainly of tool steel. An injection mould can be constructed with one or more mould cavities with mould cores. The mould core defines the inner part of the preform.

It is generally known that when designing an injection mould, undercuts must be avoided. An undercut is a concept from materials science. If in a mould the shape to be produced cannot be removed from the tool because it is enclosed, then there is an undercut. This is also referred to as "form-lock". In order to have more freedom of form, it is possible to work with movable slides. A slide makes it possible to remove shapes with an undercut from a mould. For cost reasons, the product is often designed in such a way that there are as few or no undercuts as possible.

The term "flange" as used herein means a protruding edge at the end of a tubular form that serves to attach it to another tube.

The inventors were surprised to find that a shallow groove on a mould core of an injection moulding apparatus formed an undercut that was not an obstacle in the production of preforms. The inventors came up with the idea of applying this groove to a widening of the mould core and testing it for accommodating insert pieces. Matching the combination to desired insert pieces ultimately yielded interesting results. The slight elevation in the preform resulting from the shallow groove in the mould core ensures receipt of the insert piece. The insert is no longer loose in the neck part. The insert piece will not fall out of the container neck in use. The narrowing in the neck part of the preform, which is the result of the widening on the mould core, creates a so-called "stop function". The insert piece can no longer sink deeper into the neck part, not even by force. The distance between the slight elevation and the narrowing was adjusted to the insert piece to be accommodated.

The invention will hereinafter be described in detail.

In a first aspect, the invention provides a mould core for injection moulding of preforms and an injection moulding apparatus equipped with said mould core.

The mould core for injection moulding of preforms comprises a body whose outer wall will define the inner wall of the preform. A mould core for use in the present invention comprises a raised portion with a shallow groove provided in the raised portion. The raised portion with groove is arranged in the part of the mould core facing away from the tip of the mould core. The tip is the part that will define the bottom of the preform. The shallow groove has a dimension of 0.01 to 1 mm. Preferably the dimension of the shallow groove is 0.01 to 0.5 mm, more preferably 0.012 to 0.4 mm, even more preferably 0.014 to 0.3 mm, most preferably 0.015 to 0.2 mm.

The raised portion with groove is located in the zone for defining the neck part of the preform. This location is advantageous because the neck part, after forming by injection moulding, remains unchanged when the preform is used for stretch blow moulding of containers.

The arrangement of a mould core as described above has the advantage that it is reusable and scalable. The mould core is simple in terms of construction.

The invention also provides an injection moulding apparatus with said mould core. In particular, the invention provides an injection moulding apparatus for the production of a preform according to an embodiment of the invention, the preform comprising a bottom, a tubular wall extending upwardly from the bottom in an elongated manner thereby forming a body part and a neck part following the body part, the neck part located opposite the bottom forming a pouring opening, and the neck part being provided with an internal attachment means for accommodating an insert piece, the internal attachment means comprising a combination of a slight protrusion with height (h) 0.01 to 1 mm on the internal wall of the neck part followed by a stepwise narrowing of the neck part towards the body part, the combination being adapted for form-fitting accommodation of an insert piece comprising a peripheral snap flange adapted to fit snugly in the internal attachment means of the thermoplastic plastic container, and the injection moulding apparatus comprising an injection mould and mould core, and the injection moulding apparatus being arranged for inserting the mould core into the injection mould for defining a mould for a preform, characterised in that said mould core, in the zone for defining the neck part of the preform, comprises a combination of a raised portion and a shallow groove with depth (d) 0.01 to 1 mm provided in the raised portion for defining said internal attachment means and said internal attachment means being carried out rotation symmetrically with respect to the longitudinal axis of the mould core.

A mould core and corresponding injection moulding apparatus with said mould core, allows the production of preforms with an internal attachment means using an undercut. The undercut also allows the mould core to be removed without having to use slides or other complex structures. The apparatus allows the internal attachment means to be manufactured simultaneously with the production of the preform. This is in contrast to processes where the attachment means are subsequently applied to a preform.

The raised portion of the mould core preferably comprises rounded corners. This ensures an improved removal of the mould core from the injection mould.

The walls of the shallow groove are preferably not perpendicular to the longitudinal axis of the mould core. Preferably, there are one or more walls that form an angle of less than 90 degrees with the longitudinal axis of the mould core.

The shallow groove is preferably arranged to give the corresponding part of the attachment means an inclined plane.

The angle between the longitudinal axis of the mould core and the groove wall located proximally to the injection moulding apparatus, in other words the furthest away from the pin, is preferably smaller than 15°.

This design has the advantage that a contact surface for the insert piece is made. As the insert piece runs over the inclined plane, more tension is built up. The maximum tension is built up by the wall parallel to the longitudinal axis of the mould core/preform.

In a second aspect, the invention provides a method for injection moulding a preform using the mould core described above. A characteristic of a preform of the invention is the presence of an attachment means on the inside of the neck part. This internal attachment means, present on the inside, is referred to as an "internal attachment means". The method of making this preform includes the following steps:

inserting a mould core into an injection mould thereby forming a mould for defining the preform, characterised in that the mould core, in the zone for defining said neck part, comprises a combination of a raised portion and a shallow groove with a depth (d) of 0.01 to 1 mm provided in the raised portion and rotationally symmetrical with respect to the longitudinal axis of the mould core, for defining the internal attachment means, injecting into the mould a thermoplastic plastic composition with stretch blow mouldable material, thereby forming the preform provided with the internal attachment means, removing the mould core and the injection mould, with release of the aforementioned preform with internal attachment means.

An injection moulding process as described above is a fairly classic process, but with the use of a special mould core. The process has the advantage that an undercut is formed which still permits the injection moulded part to be removed. The internal attachment means are simple to obtain, without the use of complex constructions, and without the need for post-processing. An existing injection moulding process can easily be adapted to produce preforms with an internal attachment means.

Injection moulding is known as a technique that achieves excellent tolerances for production parts. This is advantageous for the neck part and especially for an internal attachment means. The excellent tolerances contribute to a good fit when an accessory is accommodated by an attachment means.

The preform is designed to be stretch blow moulded into a container. This means that the structure of the preform is attuned to a stretch blow moulding process and the desired result. To this end, the thermoplastic composition comprises a thermoplastic which can be heated in an injection moulding and stretch blow moulding process. The thermoplastic composition is blowable in the heated state in three-dimensional direction. Furthermore, a stretching operation can be performed on it.

The production process of the preform is aimed at subsequently producing containers, preferably packaging containers, more preferably bottles.

The injection moulding process as described above is preferably followed by a stretch blow moulding process with the following steps:
 clamping the neck part of a preform according to an embodiment of the invention in a blow mould, thereby providing the neck part provided with an internal attachment means for said thermoplastic container,
 stretch blow moulding the body and bottom part of the preform against the wall of the blow mould, thereby defining the body part and the bottom part of the thermoplastic plastic container,
 releasing said stretch blow moulded thermoplastic container with the internal attachment means for accommodating an insert piece.

The use of a preform with an internal attachment means in the neck part has the advantage that these remain unchanged in the subsequent stretch blow moulding process. The neck part is not subject to stretch blow moulding. The neck part of the preform supplies the neck part for the thermoplastic container. The excellent tolerances obtained from the previous injection moulding method are retained. This is advantageous for accommodating an insert piece.

In a preferred embodiment, injection moulding and blowing are performed on two separate machines, as a 2-stage operation. It is also possible to perform this on one and the same machine (1-stage).

In a further aspect, the invention provides a preform arranged to be subjected to stretch blow moulding of a container, in which the neck part of the preform is provided with an internal attachment means, characterised in that said internal attachment means comprises a combination of a slight protrusion with height 0.01 to 1 mm on the internal wall of the neck part followed by a stepwise narrowing of a neck part towards the body part, the combination being adapted for form-fitting accommodation of an insert piece and the attachment means is rotationally symmetrical with respect to the longitudinal axis of the preform.

"Internal attachment means" as used herein means attachment means located within the preform. In the invention, the internal fastening means comprises a combination of a gentle protrusion on the inside of the preform and a narrowing of the neck of the preform. Between the gentle protrusion and neck narrowing, space is provided for snugly accommodating a protrusion externally applied on an insert piece.

The gentle protrusion has a much smaller dimension than the neck narrowing. The gentle protrusion has a dimension of 0.01 to 1 mm. Preferably, the dimension of the protrusion is 0.01 to 0.5 mm, more preferably 0.012 to 0.4 mm, even more preferably 0.014 to 0.3 mm, most preferably 0.015 to 0.2 mm. The dimension is measured from the wall of the preform in the direction of the inside of the preform.

The gentle or slight protrusion results in a minimum of material being required to provide functionality. Although the protrusion forms an undercut, the preform is still removable from the mould after production. The undercut creates a snap edge. The snap edge ensures that an insert piece is not loose in the vertical direction, parallel to the longitudinal axis of the preform. The gentle protrusion allows a removable accommodation of a complementary insert piece.

The gentle protrusion and the height of the neck narrowing are in a ratio to each other of at least 1:3, preferably 1:5, more preferably 1:8, most preferably 1:10. Preferably, both elements are thinner than the wall thickness of the neck part at the pouring opening. The neck narrowing extending from the preform wall is preferably at least 3 times smaller than the preform wall, preferably at least 4 times, most preferably at least 5 times. These ratios and dimensions have the advantage that an increased functionality is achieved with little material.

The wall of the slight protrusion located proximally to the pouring opening forms an angle $\theta$ with the longitudinal axis of the preform of less than 15°, preferably less than 12°, most preferably around 10°. This embodiment provides a contact surface for the snap flange. The insert piece is gradually compressed.

Once over the slight protrusion, the flange ends up between the protrusion and the neck narrowing.

The narrowing of the neck of the preform provides functionality as a stopping means.

This stopping means ensures that the insert piece cannot be pushed through the neck part.

The components protrusion and neck narrowing are combined to form an internal attachment means. To this end, the distance between the two elements and the design of the elements is adjusted such that an insert piece can be snugly accommodated.

Both the protrusion and the stepwise narrowing are located in the neck part, and not in the body part. This ensures that an attachment means is already present before the body and bottom part of the container are formed. The attachment means will not be deformed during the stretch blow moulding process. The design as an injection moulded part ensures excellent tolerances. This benefits the fit.

The combination is preferably posterior to the body part. With this positioning, the combination is just above the body part. This is advantageous for maximally accommodating the insert piece deep into the neck of the container.

A preform according to an embodiment of the invention is preferably obtained with a method according to the invention.

In a further aspect, the invention provides a container obtained from a preform according to the invention. In particular, the invention provides a thermoplastic plastic container obtained by injection stretch blow moulding, the container comprising a bottom part, a body part which extends upwardly from the bottom part and a neck part following the body part, the neck part situated opposite the bottom part forming a pouring opening, characterised in that the neck part is provided with an internal attachment means for accommodating an insert piece, comprising a combination of a slight protrusion with height 0.01 to 1 mm on the internal wall of the neck part followed by a stepwise narrowing of the neck part towards the body part, wherein the combination is adapted for snugly accommodating an insert piece and the attachment means is rotation symmetrically carried out with respect to the longitudinal axis of the plastic container.

A container according to an embodiment of the invention is characterised by an internal attachment means comprising a slight protrusion and a neck narrowing. The location in the neck zone ensures that the internal attachment means remain unchanged in the stretch blow moulding step, in which the body and bottom are formed. The neck part, formed by injection moulding, has excellent tolerances. This is advantageous for being able to snugly accommodate an insert piece.

The neck part is preferably obtained with an injection moulding method according to an embodiment of the invention, and the body part and bottom part are preferably obtained with a stretch blow moulding method according to an embodiment of the invention. The use of stretch blow moulding as a production method, provides thinner walls and strength at the same time.

The container may be made of a biaxially stretchable thermoplastic such as polyethylene, polypropylene, PET, polyvinyl chloride (PVC) or polystyrene. The container is preferably made of PET.

In a further aspect, the invention provides a combination of a thermoplastic container according to an embodiment of the invention and an insert piece, characterised in that the insert piece is adapted for form-fitting accommodation in an internal attachment means provided in the neck part of the container obtained with injection stretch blow moulding. The internal attachment means comprises a combination of a slight protrusion with a height of 0.01 to 1 mm. The protrusion is on the internal wall of the neck part. Towards the body part of the container, a stepwise narrowing of the neck part follows the protrusion. The combination is adapted for form-fitting accommodation of the insert piece. The attachment means is carried out rotation symmetrically with respect to the longitudinal axis of the plastic container.

The insert piece preferably comprises a peripheral snap flange, the snap flange being arranged for form-fitting accommodation in the internal attachment means of the container.

The proposed combination provides a set of complementary parts. There is a minimal use of material. The insert piece is removable and reusable.

The internal attachment means and the insert piece are preferably carried out with tolerances for providing a liquid-tight fit when the insert piece is accommodated in the internal attachment means.

The term "engineering fit" as used herein refers to the extent to which matching parts fit together. An engineering fit determines which tolerances are allowed with parts that fit into each other. In the present invention, it is advantageous that a liquid-tight fit is used. This means that the parts that fit into each other do not have any gaps, as a result of which a large amount of liquid could leak when pouring through the dosing cap.

The insert piece preferably comprises a pouring spout. An insert piece with pouring spout forms an accessory that is advantageous for pouring liquids, gels, powders. Less is spilled than with a container with pouring opening. The pouring spout can be used for dispensing any product that has flow, including household and personal care products, food or feed. Flowable products comprise liquids, gels, but also powders. In a preferred embodiment, the insert piece can be freely rotated to select the pouring direction. In another preferred embodiment, the rotation is limited.

Preferably, the container and insert piece are further combined with a dosing cap. The dosing cap is preferably designed to at least partially accommodate the accessory with pouring spout.

The dosing cap is preferably provided for accommodating a screw thread on the neck part of a container. This is advantageous for closing off the container.

The combination of a dosing cap and insert piece with pouring spout ensures that an amount of liquid or gel or powder can be measured out. This results in a more suitable dosage. The insert piece is compatible with existing screw caps. The fitting of the insert piece is very simple, merely snapping it into the container is sufficient. The insert piece is easy to make. No complex mould design is required to make a screw thread, neither on the outside nor on the inside.

The combination can be advantageously used for dosing and administering detergent, fabric softener, plant food, pesticide.

The combination insert piece/dosing cap can be provided on the neck opening of a container in assembled condition.

The insert piece can also be provided separately. In such case, a container neck is closed off with the dosing cap. The insert piece can be applied after the container is opened. The insert piece can for example be accommodated in a storage compartment provided in a container wall.

In a further aspect, the invention provides an insert piece for a thermoplastic plastic container according to an embodiment of the invention, comprising a peripheral snap flange for accommodation in the neck part of the thermoplastic plastic container, characterised in that the snap flange is arranged for form-fitting accommodation in an internal attachment means arranged in the internal neck part of the thermoplastic plastic container, the internal attachment means comprising a combination of a slight protrusion with height 0.01 to 1 mm on the internal wall of the neck part of the container followed by a stepwise narrowing of the neck part towards the body part of the container.

Preferably, the insert piece comprises a peripheral snap flange merging into a surrounding wall, a U-shaped floor and a pouring spout rising from the inner part of the floor, characterised in that the surrounding wall and U-shaped floor are arranged as a spring element for the peripheral snap flange.

The peripheral snap flange and the insert piece are preferably carried out with tolerances for providing a liquid-tight fit when the insert piece is accommodated in the internal attachment means. This embodiment is advantageous for preventing product loss. The user comfort is increased because the container does not necessarily have to be stored or used in a standing position.

The insert piece is preferably an injection moulded part. The use of the injection moulding technique creates a moulded part with excellent tolerances. This benefits a good fit of the insert piece. The insert piece may be made of a thermoplastic such as polyethylene, polypropylene, PET, polyvinyl chloride (PVC) or polystyrene.

In another preferred embodiment, the insert piece comprises a peripheral snap flange arranged on an end of a flexible tube.

The insert piece may also be a dosing cap equipped with a peripheral snap flange for accommodation in the neck of a container with internal attachment means according to an embodiment of the invention.

The invention is further illustrated by way of examples. The examples are non-exhaustive.

FIGS. 1A to 1C show a part of an injection moulding apparatus 20, namely the mould core 1. In the zone for defining the neck part 7 of the preform 10, the mould core 1 has a raised portion 2 with a shallow groove 12 (see detail view in FIG. 2B) in the raised portion 2. These components ensure the definition of the internal attachment means 15 (see detail view of FIG. 2B). The shallow groove 12 provides a correspondingly gentle protrusion on the wall of the preform 10. The raised portion 2 on the mould core 1 provides a stepwise narrowing 11 at the preform 10. The tip 8 of the mould core 1 provides definition of the bottom part 6 in the preform 10.

Figure 2B:
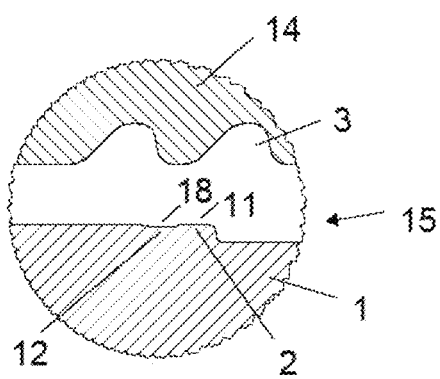

FIGS. 2A and 2B show a part of an injection moulding apparatus 20, namely a mould core 1 accommodated in an injection mould 14. FIG. 2B shows a detail view of the circled area A. The mould core 1 accommodated in the injection mould 14, causes the formation of a mould 22 for the formation of a preform. In the neck part, the mould core 1 is provided with a raised part 2 with a shallow groove 12. These parts provide a protrusion 18 and stepwise narrowing 11 in the mould. In a preform, these will give a combination of a protrusion 18 and stepwise narrowing 11.

FIGS. 3A to 3C show results of the preform 10 production with a mould core 1 according to an embodiment of the invention. The preform 10 comprises a neck part 7, a body part 5 and a bottom part 6. The neck part has a pouring opening 21 at the end opposite the bottom part 6. The neck part 7 is provided with a screw thread 3 and a neck ring 4 on the outer wall. The neck part 7 is provided with internal attachment means 2 on the inner wall.

Figure 5:
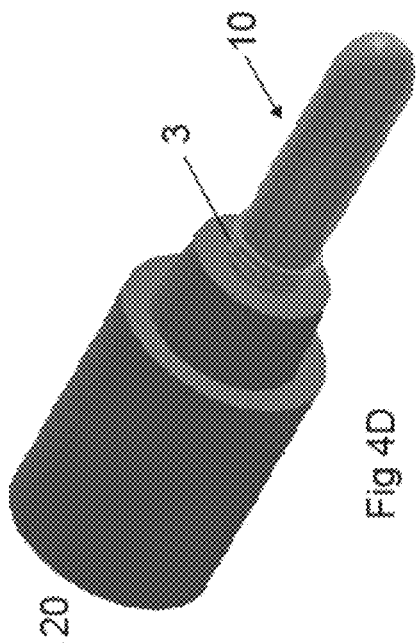
FIG. 5 is a detail view of an internal attachment means on the wall of the preform with the corresponding provisions on the mould core, scale 10:1.
Figure 4D:
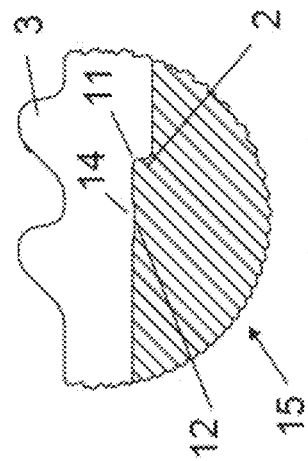
FIGS. 4A to 4D show a schematic representation of a preform according to an embodiment of the invention incorporated on a mould core of an injection moulding apparatus (scale 1:1).
Figure 4A:
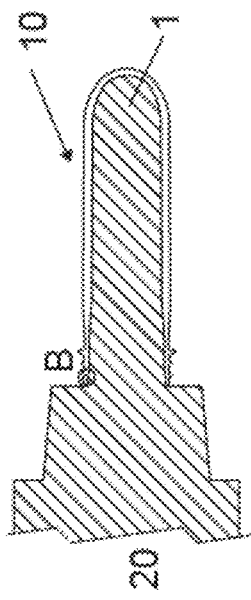
Figure 4B:
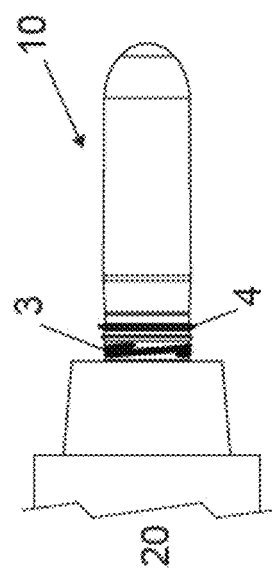
Figure 4C:
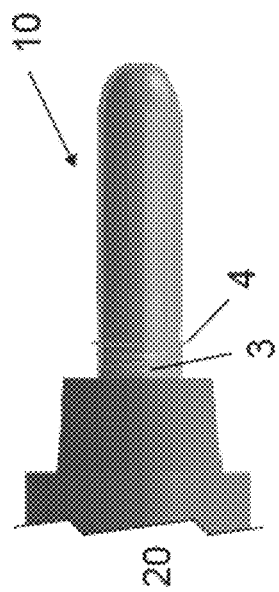

FIGS. 4A to 4D show a schematic representation of a preform 10 accommodated on a mould core 1. FIG. 5 shows a detail view of the circled area B. The neck opening is wider where the mould core 1 has a widening 2 with height H. The transition from widening to a narrower part of the mould core 1 results in a stepwise narrowing 11 in the neck part 7 of the preform 10. The shallow groove 12 in the mould core 1 provides a corresponding slight elevation 18 in the preform 10. The combination of the slight elevation 18 and the stepwise narrowing 11 provides the attachment means 15 for accommodating an insert piece (not shown).

Figure 6:
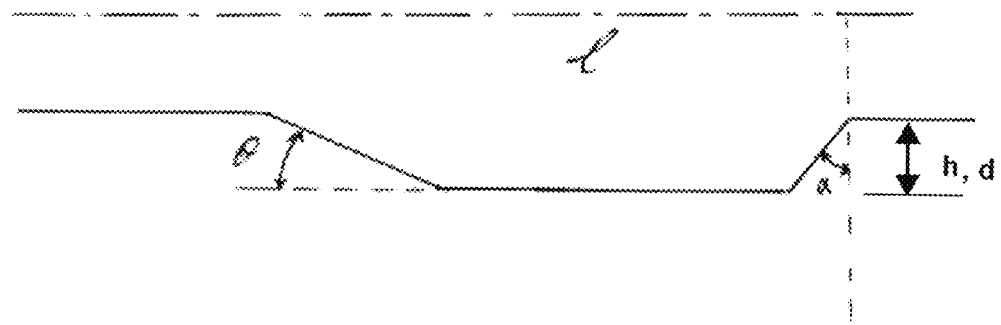
FIG. 6 shows a schematic representation of an attachment means according to an embodiment of the invention.

FIG. 6 shows a schematic representation of the internal attachment means according to an embodiment of the invention. This attachment means comprises a combination of a slight elevation 18 with height h and a stepwise narrowing 11. The attachment means is arranged in the wall of a neck part. The neck part can be located in a preform or container obtained from the preform, obtained by injection moulding of at least the neck part. The slight elevation is equipped with a contact surface for accommodating a snap flange. To this end, the wall closest to the pouring opening is inclined upwards. The wall is at an angle θ of 10° to the longitudinal axis (l) of the neck part. Once the snap flange is pushed over the contact surface, the snap flange is accommodated in the opening between the attachment means. The narrowing of the neck provides a stop function. The snap flange cannot sink deeper into the neck. The wall of the slight elevation towards the narrowing is preferably also bevelled. Typically, there is an angle α of 45° between the inclined wall of the slight elevation and an axis perpendicular to the longitudinal axis (l) of the neck part. The mould core for defining the internal attachment means was equipped with a corresponding shallow groove with depth d.

Figure 7:
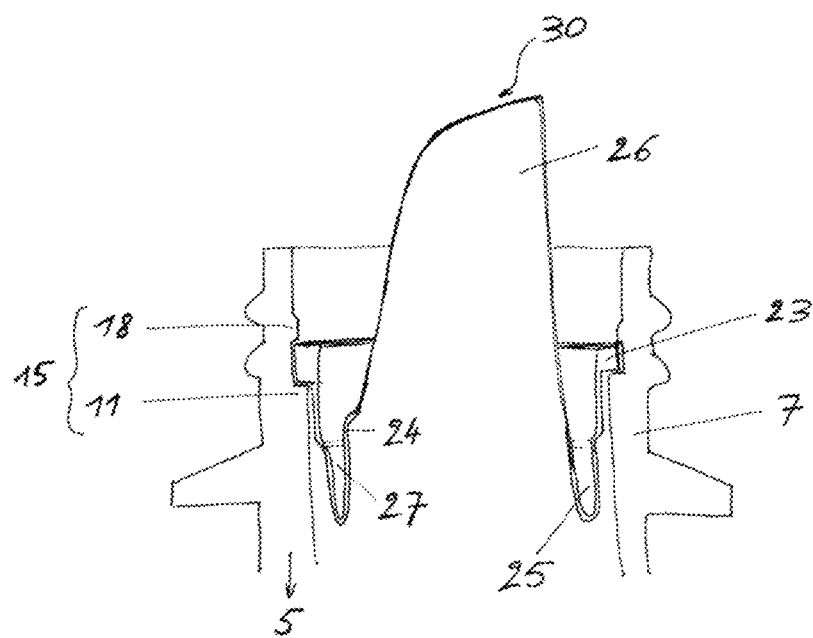
FIG. 7 shows a schematic representation of an insert piece inserted in the neck part of a container. The insert piece is positioned with the tip of the pouring spout directed towards the inside of the container. This is the storage position.
Figure 8:
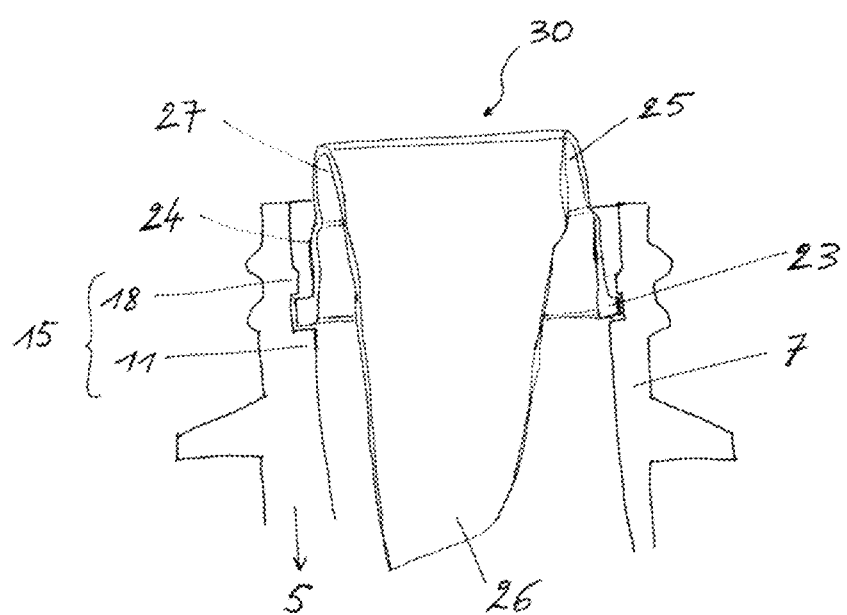
FIG. 8 shows a schematic representation of an insert piece inserted in the neck part of a container. The insert piece is positioned with the tip of the pouring spout directed away from the container. This is the configuration in use.

FIGS. 7 and 8 show a schematic representation of an insert piece 30 according to an embodiment of the invention. In FIG. 7, the insert piece is positioned with the tip of the pouring spout directed towards the inside of the container. This is the storage position. In FIG. 8, the insert piece is positioned with the tip of the pouring spout directed away from the container. This is the configuration in use.

The insert piece 30 is mounted in the internal attachment means 15 on the inside of the neck part 7 of a thermoplastic plastic container 9. The peripheral snap flange 23 of the insert piece 13 is accommodated between the walls of the neck part 7 of the container 9. The internal attachment means 15 comprise a combination of a slight protrusion 18 followed by a stepwise narrowing 11 of the neck part 7. The peripheral snap flange 23 merges into a surrounding wall 24, a U-shaped floor 25 and a pouring spout 26 rising from the inner part of the floor of the insert piece 30. The surrounding wall 24 and U-shaped floor 25 are arranged as a spring element 27 for the peripheral snap flange 23. This allows for easy positioning of the insert piece 30.

Figure 9:
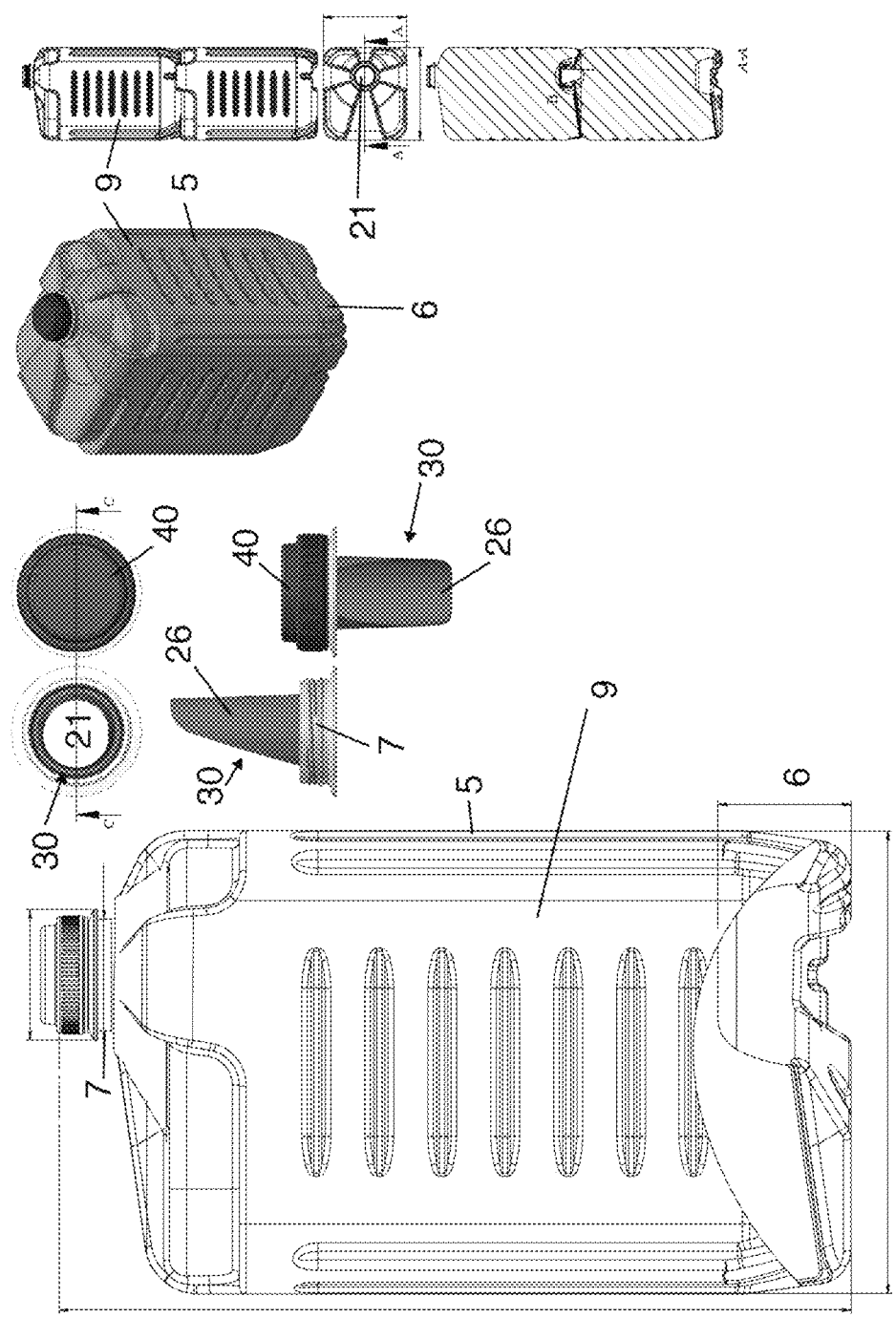
FIG. 9 shows schematic representations of a container with internal attachment means inside the neck in combination with an insert piece, according to an embodiment of the invention.

FIG. 9 shows a schematic representations of a thermoplastic plastic container 9 with attachment means 15 in the neck part 7, according to an embodiment of the invention, for use in combination with a neck piece 30 according to the invention.

The thermoplastic plastic container 9 was obtained by injection stretch blow moulding. The container 9 comprises a bottom part 6, a body part 5 which extends upwardly from the bottom part 6 and a neck part 7 following the body part 5. The neck part 7 situated opposite the bottom part 6 forms a pouring opening 21. The neck part 7 is provided with an internal attachment means 15 for accommodating an insert piece 30 comprising a combination of a slight protrusion with height 0.01 to 1 mm on the internal wall of the neck part 7 followed by a stepwise narrowing of the neck part 7 towards the body part 5. The combination is adapted for snugly accommodating an insert piece 30. The attachment means 15 has a rotation symmetrically arrangement. The pouring opening of the container 9 is located out of the centre of the container. This arrangement is advantageous, especially for bulk containers with a volume of at least 5 litres, as it allows for improved pouring.

The invention claimed is:

1. A method for injection moulding of a preform adapted for stretch blow moulding of a container, the preform comprising a bottom, a tubular wall extending upwards from the bottom in an elongated manner thereby forming a body part and a neck part following the body part, the neck part located opposite the bottom forming a pouring opening, and the neck part being provided with an internal attachment means for accommodating an insert piece, the method comprising the following steps:
   inserting a mould core into an injection mould thereby forming a mould for defining the preform, wherein the mould core, in a zone for defining said neck part, comprises a combination of a raised portion and a shallow groove with a depth of 0.01 to 1 mm provided in the raised portion and rotationally symmetrical with respect to a longitudinal axis of the mould core, for defining the internal attachment means;
   injecting into the mould a thermoplastic plastic composition with stretch blow mouldable material, thereby forming the preform provided with the internal attachment means;

removing the mould core and the injection mould, with release of the aforementioned preform with internal attachment means.

2. A preform arranged to be subjected to stretch blow moulding of a container, the preform comprising a bottom, a tubular wall extending upwardly from the bottom in an elongated manner thereby forming a body part and a neck part following the body part,
   wherein the neck part located opposite the bottom forms a pouring opening, and the neck part is provided with an internal attachment means for accommodating an insert piece,
   wherein the preform comprises a stretch blow mouldable thermoplastic composition,
   wherein said internal attachment means comprises a combination of a slight protrusion with height 0.01 to 1 mm on an internal wall of the neck part followed by a stepwise narrowing of the neck part towards the body part, the combination being adapted for form-fitting accommodation of an insert piece and the attachment means is rotationally symmetrical with respect to a longitudinal axis of the preform.

3. The preform according to claim 2, wherein the combination is posterior to the body part.

4. The preform according to claim 2, wherein the wall of the slight protrusion located proximally to the pouring opening, forms an angle θ with the longitudinal axis of the preform of less than 15°.

5. The preform according to claim 2, obtained with a method for injection moulding of the preform comprising the following steps:
   inserting a mould core into an injection mould thereby forming a mould for defining the preform, wherein the mould core, in a zone for defining said neck part, comprises a combination of a raised portion and a shallow groove with a depth of 0.01 to 1 mm provided in the raised portion and rotationally symmetrical with respect to a longitudinal axis of the mould core, for defining the internal attachment means;
   injecting into the mould a thermoplastic plastic composition with stretch blow mouldable material, thereby forming the preform provided with the internal attachment means;
   removing the mould core and the injection mould, with release of the aforementioned preform with internal attachment means.

6. A method for stretch blow moulding a thermoplastic plastic container comprising a neck part provided with an internal attachment means for accommodating an insert piece, the method comprising the following steps:
   providing a preform with internal attachment means according to claim 2,
   wherein said internal attachment means comprises a combination of a slight protrusion with height 0.01 to 1 mm on an internal wall of the neck part followed by a stepwise narrowing of the neck part towards the body part, the combination being adapted for form-fitting accommodation of an insert piece,
   clamping the neck part of the preform in a blow mould, thereby providing the neck part provided with the internal attachment means for said thermoplastic plastic container,
   stretch blow moulding of the body and bottom part of the preform against the wall of the blow mould, thereby defining the body part and the bottom part of the thermoplastic plastic container,
   releasing said stretch blow moulded thermoplastic plastic container.

7. A thermoplastic plastic container obtained by injection stretch blow moulding, comprising a bottom part, a body part which extends upwardly from the bottom part and a neck part following the body part, the neck part situated opposite the bottom part forming a pouring opening,
   wherein the neck part is provided with an internal attachment means for accommodating an insert piece comprising a combination of a slight protrusion with height 0.01 to 1 mm on an internal wall of the neck part followed by a stepwise narrowing of the neck part towards the body part;
   wherein the combination is adapted for snugly accommodating an insert piece and the attachment means is rotation symmetrically carried out with respect to a longitudinal axis of the plastic container.

8. The thermoplastic plastic container according to claim 7, wherein the neck part is obtained with an injection moulding method including:
   inserting a mould core into an injection mould thereby forming a mould for defining the preform, wherein the mould core, in a zone for defining said neck part, comprises a combination of a raised portion and a shallow groove with a depth of 0.01 to 1 mm provided in the raised portion and rotationally symmetrical with respect to the longitudinal axis of the mould core, for defining the internal attachment means;
   injecting into the mould a thermoplastic plastic composition with stretch blow mouldable material, thereby forming the preform provided with the internal attachment means;
   removing the mould core and the injection mould, with release of the aforementioned preform with internal attachment means;
wherein the body part and bottom part are obtained with a stretch blow moulding method including:
   clamping the neck part of the preform in a blow mould, thereby providing the neck part provided with the internal attachment means for said thermoplastic plastic container;
   stretch blow moulding of the body and bottom part of the preform against the wall of the blow mould, thereby defining the body part and the bottom part of the thermoplastic plastic container;
   releasing said stretch blow moulded thermoplastic plastic container.

9. The thermoplastic plastic container according to claim 7, wherein the pouring opening of the container is located off-centre.

10. A combination of a thermoplastic plastic container according to claim 7 and an insert piece,
   wherein the insert piece is adapted for form-fitting accommodation in an internal attachment means provided in the neck part of the container obtained with injection stretch blow moulding and comprising a combination of a slight protrusion with height 0.01 to 1 mm on an internal wall of the neck part followed by a stepwise narrowing of the neck part towards the body part, the combination being adapted for form-fitting receipt of the insert piece and the attachment means is carried out rotation symmetrically with respect to a longitudinal axis of the plastic container;
   wherein the insert piece comprises a peripheral snap flange for accommodation in the internal attachment means.

11. The combination according to claim 10, wherein the internal attachment means and the insert piece are carried out with tolerances for providing a liquid-tight fit when the insert piece is accommodated in the internal attachment means.

12. The combination according to claim 10, wherein the insert piece is a pouring spout.

13. The combination according to claim 10, further in combination with a dosing cap arranged for at least a partial accommodation of a pouring spout and provided with an internal screw thread for attachment to a thermoplastic plastic container obtained by injection stretch blow moulding, comprising a bottom part, a body part which extends upwardly from the bottom part and a neck part following the body part, the neck part situated opposite the bottom part forming a pouring opening, wherein the neck part is provided with an internal attachment means for accommodating an insert piece comprising a combination of a slight protrusion with height 0.01 to 1 mm on an internal wall of the neck part followed by a stepwise narrowing of the neck part towards the body part, wherein the combination is adapted for snugly accommodating an insert piece and the attachment means is rotation symmetrically carried out with respect to a longitudinal axis of the plastic container;

wherein the thermoplastic plastic container is provided externally on the neck part with an external attachment means;

wherein the external attachment means consist of annular recesses for accommodating the screw thread.

14. An injection moulding apparatus for the production of a preform according to claim 2, the preform comprising a bottom, a tubular wall extending upwardly from the bottom in an elongated manner thereby forming a body part and a neck part following the body part, the neck part located opposite the bottom forming a pouring opening, and the neck part being provided with an internal attachment means for accommodating an insert piece, the internal attachment means comprising a combination of a slight protrusion with height 0.01 to 1 mm on an internal wall of the neck part followed by a stepwise narrowing of the neck part towards the body part, the combination being adapted for form-fitting accommodation of an insert piece comprising a peripheral snap flange adapted to fit snugly in the internal attachment means of a thermoplastic plastic container, and the injection moulding apparatus comprising an injection mould and mould core, the injection moulding apparatus being arranged for inserting the mould core into the injection mould for defining a mould for a preform, wherein said mould core, in a zone for defining the neck part of the preform, comprises a combination of a raised portion with a shallow groove with depth 0.01 to 1 mm provided in the raised portion for defining the internal attachment means and said internal attachment means being carried out rotation symmetrically with respect to the longitudinal axis of the mould core.

15. The injection moulding apparatus according to claim 14, wherein the raised portion comprises rounded corners.

16. The injection moulding apparatus according to claim 14, wherein a groove wall forms an angle ($\theta$, $\alpha$) of less than 90 degrees, measured between the longitudinal axis of the mould core and the corresponding shallow groove.

17. The injection moulding apparatus according to claim 16, wherein the angle $\theta$ between the longitudinal axis of the mould core and a shallow groove wall located proximally to the injection moulding apparatus, is smaller than 15°.

18. An insert piece for a thermoplastic plastic container according to claim 7, comprising a peripheral snap flange for accommodation in the neck part of the thermoplastic plastic container, wherein the snap flange is arranged for form-fitting accommodation in the internal attachment means arranged in an internal neck part of the thermoplastic plastic container, the internal attachment means comprising a combination of a slight protrusion with height 0.01 to 1 mm on the internal wall of the neck part of the container followed by a stepwise narrowing of the neck part towards the body part of the container.

19. The insert piece according to claim 18, the peripheral snap flange merging into a surrounding wall, a U-shaped floor and a pouring spout rising from an inner part of the floor, wherein the surrounding wall and U-shaped floor are arranged as a spring element for the peripheral snap flange.

20. The insert piece according to claim 18, wherein the peripheral snap flange is carried out with tolerances for providing a liquid-tight fit when the insert piece is accommodated in the internal attachment means.

\* \* \* \* \*